United States Patent [19]
Hai

[11] 3,943,658
[45] Mar. 16, 1976

[54] INTENSIVE CULTIVATION
[75] Inventor: Harry Wong Hon Hai, Kowloon, Hong Kong
[73] Assignee: Winner Food Products Limited, Kowloon, Hong Kong
[22] Filed: June 24, 1974
[21] Appl. No.: 482,334

[52] U.S. Cl. .................................. 47/1.2; 47/16
[51] Int. Cl.² ...................... A01G 31/00; A01C 1/00
[58] Field of Search ........................ 172/16, 14, 1.2

[56] References Cited
UNITED STATES PATENTS

| | | | |
|---|---|---|---|
| 2,051,461 | 8/1936 | Lee | 47/1.2 |
| 2,296,849 | 9/1942 | Hammerstrom et al. | 47/16 |
| 2,810,988 | 10/1957 | Chin | 47/1.2 X |
| 2,896,374 | 7/1959 | Perin | 47/1.2 |
| 3,616,560 | 11/1971 | Mun | 47/1.2 |
| 3,768,201 | 10/1973 | Yoo | 47/1.2 X |

*Primary Examiner*—Stephen C. Pellegrino
*Attorney, Agent, or Firm*—Steward & Steward

[57] ABSTRACT

Apparatus providing a controlled environment for intensive cultivation of vegetable matter, e.g. bean sprouts is disclosed. A valve regulates the supply of water from a reservoir to a water-spray inlet in the roof of a cultivation chamber having an air vent and a water drainage outlet. A timing device, operatively connected to a valve actuating mechanism, opens the valve for a predetermined length of time at predetermined intervals. The water supplied to the spray inlet is heated by a thermostatically controlled heater. The chamber may be thermally insulated and its interior may be heated by a thermostatically controlled heater.

6 Claims, 6 Drawing Figures

INTENSIVE CULTIVATION

This invention relates to the intensive cultivation of vegetable matter, especially bean sprouts, in an apparatus providing a controlled environment.

The invention provides intensive cultivation apparatus comprising a chamber having an air vent and a water drainage outlet, spray means in the roof of the chamber, a reservoir for supplying water to the spray means, a thermostatically controlled heater arranged to heat the water supplied to the spray means, a valve regulating the supply of water from the reservoir to the spray means, a valve actuating mechanism operatively associated with the valve, and a timing device operatively connected to the actuating mechanism to open the valve for a predetermined length of time at predetermined intervals.

If the apparatus is to be used in an environment whose temperature differs greatly from the optimum cultivation temperature, it is preferable for the chamber to be thermally insulated; in addition, a thermostatically controlled heater may be arranged to heat the interior of the chamber.

The vegetable matter is placed in the chamber as seeds alone, which are allowed to germinate, or as seeds in a growth medium in which the seeds germinate and grow; or the vegetable matter has already germinated and is put in with a growth medium. In the particular case of the cultivation of bean sprouts, the beans are simply put in the chamber and are removed when germination is complete.

To ease removal of the vegetable matter, an open-topped removable box can be provided in the chamber below the spray means, and is preferably mounted on slideways. For the production of frequent small batches of vegetable matter (rather than an infrequent batch occupying the whole chamber) more than one said spray means can be provided; one said box will be arranged below each spray means. In this case each spray means can have a separate valve, the valves being opened in sequence by the timing device.

The invention will be described further, by way of example only, with reference to the accompanying drawings, in which.

Figure 1:
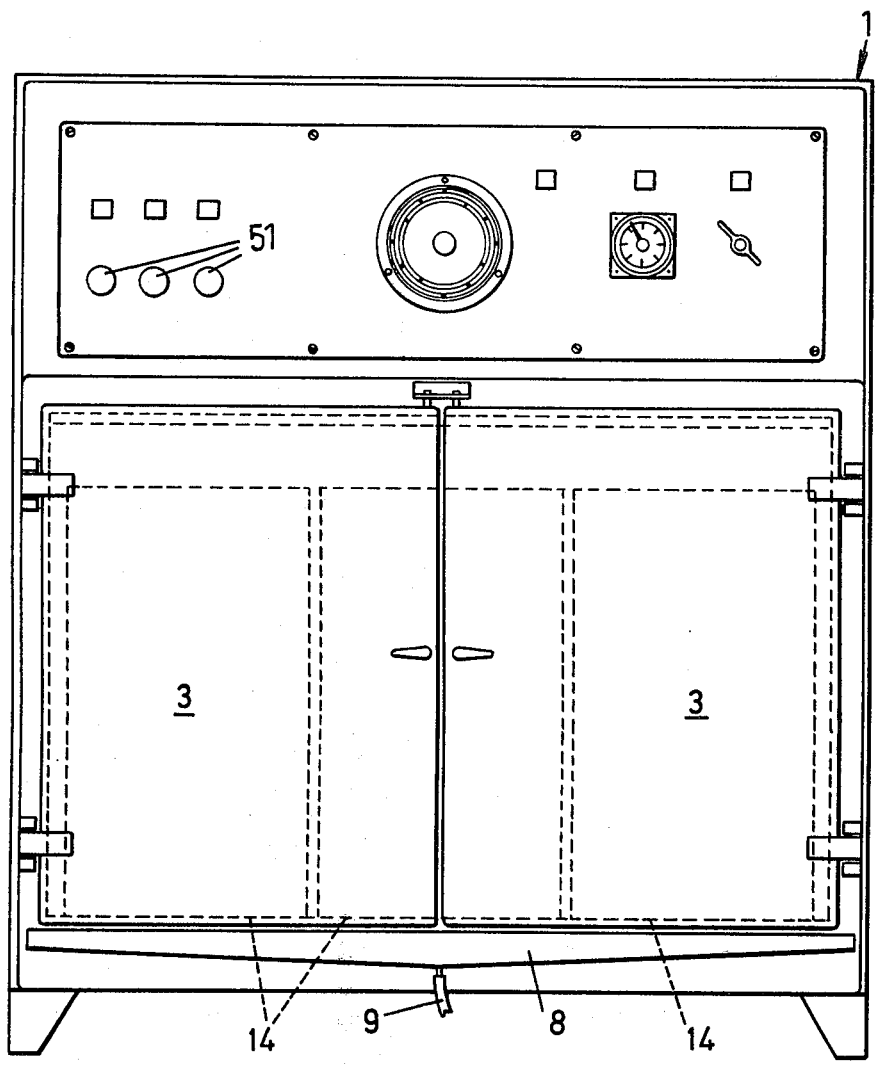
FIG. 1 is a front view of apparatus for the intensive cultivation of bean sprouts.
Figure 2:
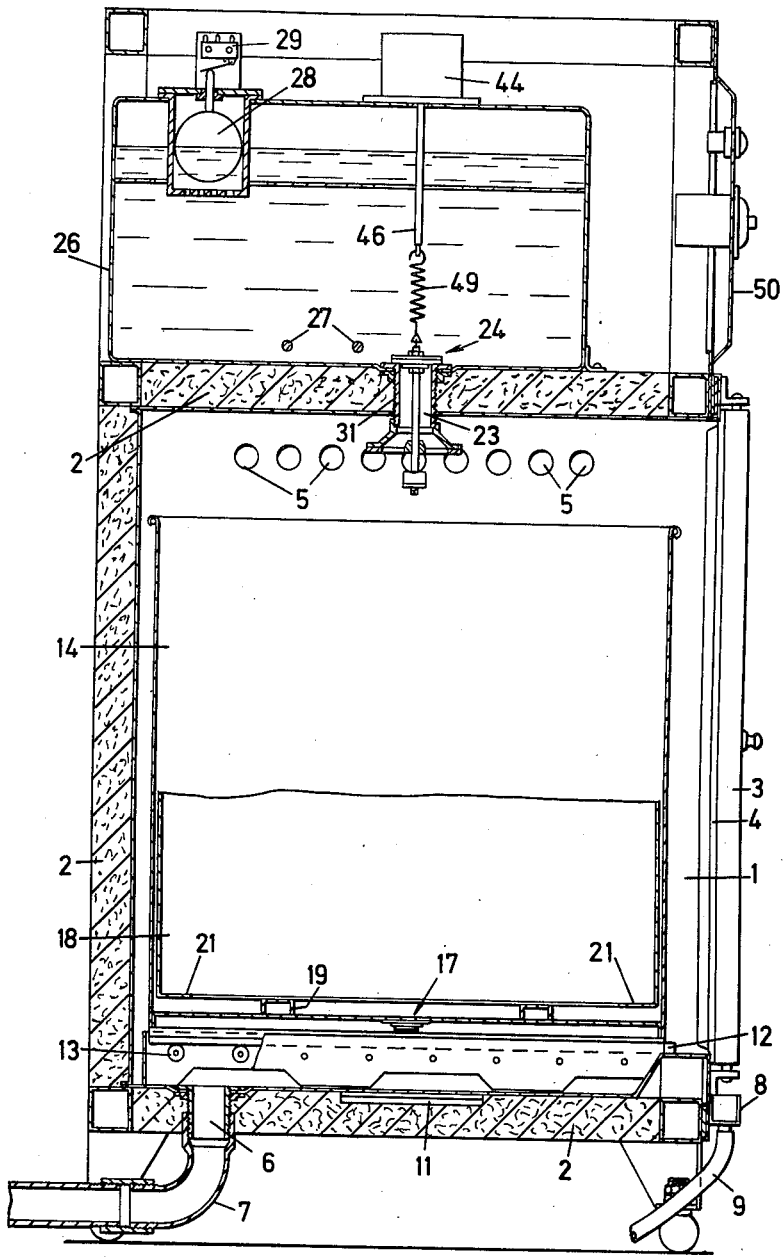
FIG. 2 is a side view of the apparatus, in vertical section.
Figure 3:
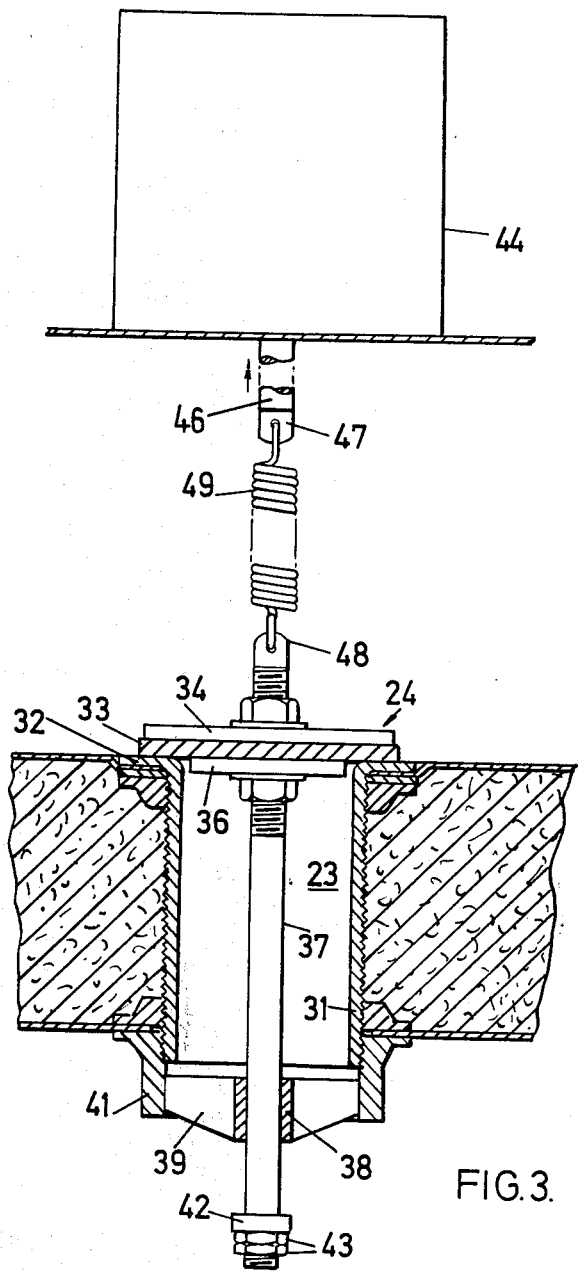
FIG. 3 is a detail of FIG. 2, on an enlarged scale.
Figure 4:
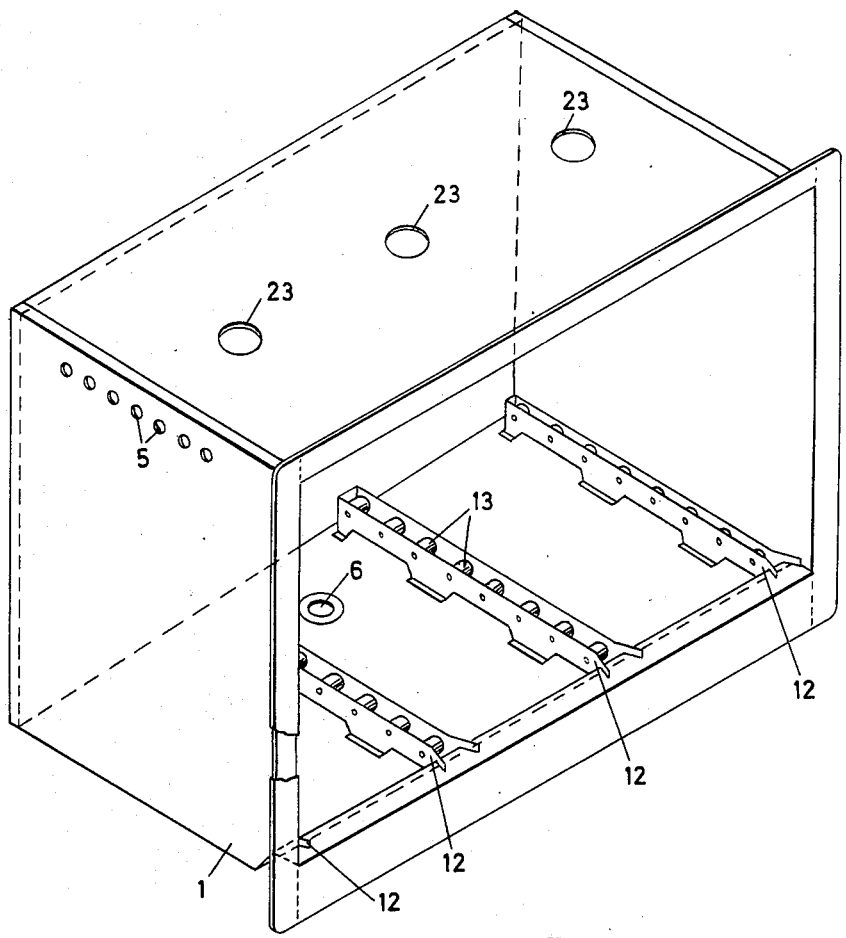
FIG. 4 is a perspective view of the chamber of the apparatus.

The illustrated apparatus has a growth chamber 1, whose roof, base, and rear and side walls are covered externally with a thermally insulating material 2. The chamber 1 is closed at the front by a pair of doors 3 having a sealing gasket 4. At the upper end of both side walls there are air vent holes 5. In the base there is a water drainage hole 6 communicating with a drain pipe 7. To prevent spillage of water when the doors 3 are opened, a trough 8 runs right along below the door sill and communicates with a central drain pipe 9.

An electrical heating element 11 in the base of the chamber 1 is controlled by a thermostat (not shown) responding to the air temperature in the interior of the chamber.

Figure 5:
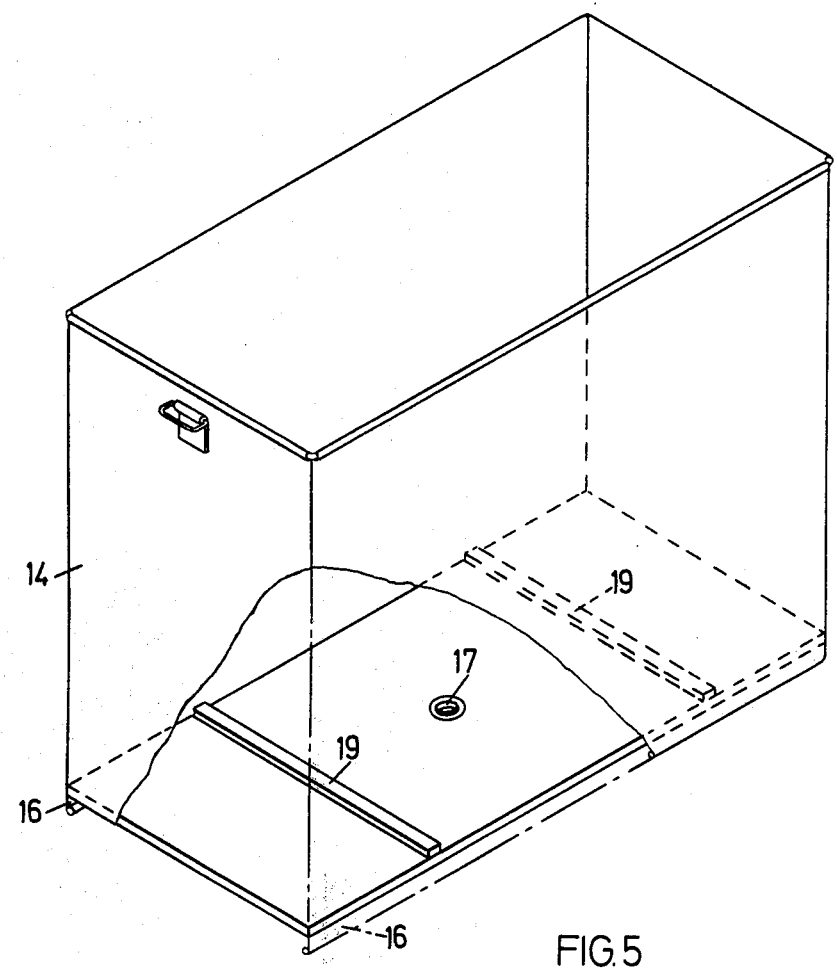
FIG. 5 is a cut-away perspective view of a box which fits inside the chamber.

On the base of the chamber 1 there are four equi-spaced slideways 12 including rollers 13. Each pair of adjacent slideways is arranged to carry an open-topped box 14 (FIG. 5). The bottom of the box has a pair of longitudinal flanges 16 which run on the rollers 13 of the slideways 12. A drain hole 17 in the bottom of the box, which is fitted with a filter (not shown), has an adjustable valve (not shown in detail) to control the rate of drainage, so that the bean sprouts are soaked for a certain time.

Figure 6:
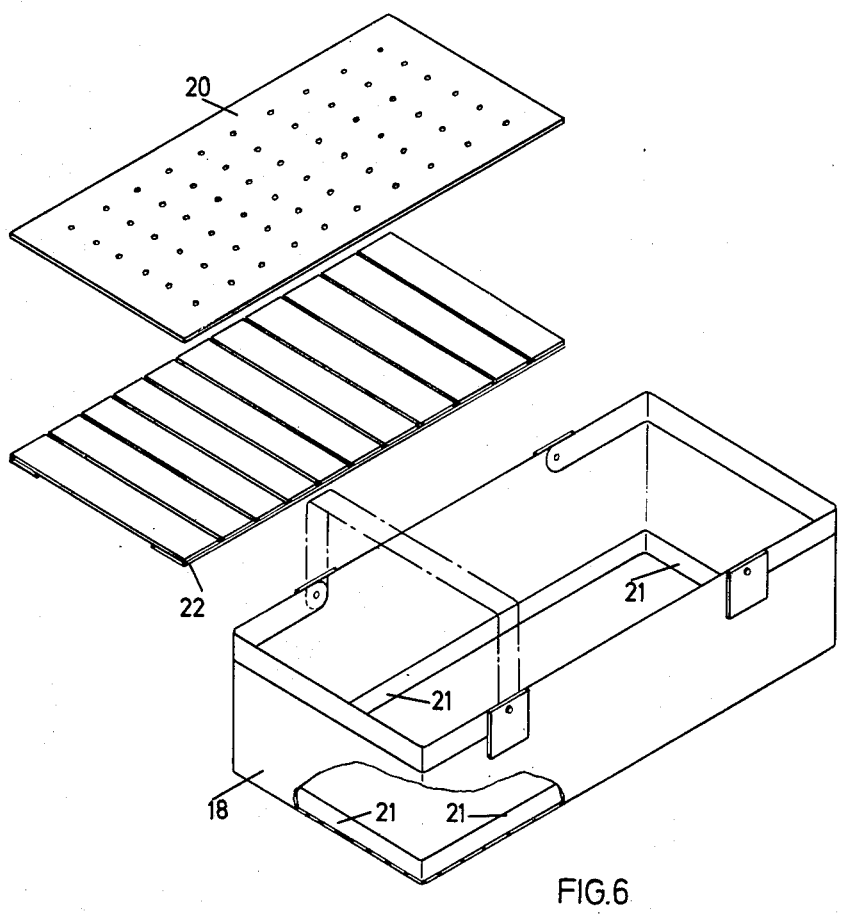
FIG. 6 is an exploded perspective view of a basket which fits inside the box.

A basket 18 (FIG. 6) for holding beans rests on transverse slats 19 on the bottom of the box 14, which can hold two baskets, one on top of the other. The lower ends 21 of the basket walls are inwardly flanged to support the removable slotted base 22 of the basket. (Alternatively the base 22 may be permanently fixed.) The basket 18 also has a perforated cover 20 which is to rest on the beans. The cover 20 allows free passage of water but prevents the beans and bean sprouts from floating out of the basket; it also reduces the amount of light and oxygen reaching the bean sprouts, so that red cotyledons and green leaves — whose presence is unacceptable in good quality bean sprouts — are avoided.

In the roof of the chamber 1, above each box 14, there is a water-spray inlet 23 fitted with a valve 24. The inlets 23 communicate with a water-reservoir in the form of a tank 26 mounted on top of the chamber 1. The water in the tank 26 is heated by immersed electrical heating elements 27 controlled by a thermostat (not shown) responding to the temperature of the water. The water level is maintained by a ball float 28 which cooperates with a switch 29 controlling a water supply valve (not shown). The tank 26 holds a volume of water sufficient to spray one box of beans.

Each valve 24 has a tubular valve-seat 31, extending from the tank 26 to the chamber 1, with a flange 32 at its upper end on which rests a washer 33 held between a valve closure disc 34 and a support disc 36. The washer and discs are mounted on a guide rod 37 which extends downwards through a collar 38 mounted on three struts 39 rigidly connected to a mounting ring 41 at the bottom of the tubular valve-seat. A regulating ring 42 is supported at an adjustable position on the rod 37 by a pair of lock-nuts 43. The ring 42 cooperates with the collar 38 to limit the extent to which the valve disc 34 is raised and, hence, to limit the rate of flow of water when the valve is open.

The valve 24 is opened by an electromagnet 44 having a movable core which is rigid with a bar 46 which hangs down into the tank 26. The bar 46 and rod 37 are formed with respective end lugs 47,48 which are connected by a buffer spring 49. When the electromagnet is activated, it raises the bar 46 and with it the spring 49 and rod 37 so that the ring 42 comes into contact with the collar 38.

The electromagnets 44 are supplied with current by a circuit including a timing device (not shown), so that each electromagnet is activated for a short time every 3 to 5 hours. Each electromagnet is associated with a push-button switch 51 to disconnect it if the corresponding valve 24 is not to be opened. e.g. if the box fed by that valve is empty.

The timing device can be purely electrical or can comprise a constantly rotating cam disc (performing a complete revolution every 3 to 5 hours) contacted by a cam-follower roller or rollers. Preferably there is one roller or set of rollers associated with each electromagnet 44 so that the valves 24 are opened in sequence.

In the chamber 1, when the conditions of temperature and spraying frequency are set correctly by means of the control panel 50, it takes 72 hours for previously soaked beans to sprout fully. Using baskets 18 each capable of holding 50lb of bean sprouts, it is possible to obtain a 100lb crop of bean sprouts daily by proceeding as follows.

At the start of the first day, two baskets 18 of ready-soaked beans are introduced into the left hand (LH) box 14. The electrical power supply is switched on and the desired chamber and water temperatures are set on the control panel 50. The LH switch 51 associated with the LH electromagnet 44 is switched on, the other two being off. The timing device activates the electromagnet every 4 hours, for example, to spray the beans in the LH basket. As the beans sprouts grow, the cover 20 will rise in each basket 18. After 3 days, the cover will be close to the top of the basket and the bean sprouts will be ready for harvesting.

At the start of the second day, two baskets of soaked beans are placed in the middle box and the middle switch 51 is switched on. At the start of the third day, two baskets are placed in the right hand (RH) basket and the RH switch 51 is switched on.

At the start of the fourth day, the bean sprouts in the LH box are harvested and two fresh baskets of soaked beans are placed in the LH box. The cycle of operations then continues as above, a harvest being obtained daily.

To harvest the crop of bean sprouts, the box 14 is drawn out of the chamber 1. The upper basket 18 is lifted from the box, the cover 20 is removed, and the bean sprouts are emptied into a large container; the lower basket is then emptied in the same way. Subsequently, the bean sprouts are washed.

Various modifications may be made within the scope of the invention. For instance, ultra-violet lighting may be provided within the chamber. Also, the humidity of the air may be controlled, e.g. by extracting damp air from the chamber by a fan, or by blowing warm, dry air into the chamber.

I claim:

1. Intensive cultivation apparatus comprising a chamber having an air vent and a water drainage outlet, a plurality of spray means in the roof of the chamber, a reservoir for supplying water to the spray means, a thermostatically controlled heater arranged to heat the water supplied to the spray means, a plurality of valves regulating the supply of water from the reservoir to the respective spray means, a plurality of valve actuating mechanisms operatively associated with the respective valves, a timing device operatively connected to the actuating mechanisms to open the valves sequentially for a predetermined length of time at predetermined intervals, and a plurality of open-topped removable boxes in the chamber below the respective spray means, each of said valves comprising a tubular valve-seat, a guide rod extending longitudinally through the tubular valve-seat, a valve closure member mounted on the rod and cooperating with the upper end of the valve-seat in order to open and close the valve, a spring connecting the rod to the respective said actuating mechanism, a collar rigid with the valve-seat and guiding the rod, and a stop mounted on the rod below the collar to limit the upward travel of the rod when the valve is opened by the respective actuating mechanism.

2. Apparatus as claimed in claim 1, further comprising slideways in said chamber, said box being slidably mounted on said slideways.

3. Apparatus as claimed in claim 1, wherein said box contains two baskets.

4. Apparatus as claimed in claim 3, wherein each basket has a perforated cover capable of rising with vegetable matter growing in the basket.

5. Apparatus as claimed in claim 1, wherein said chamber is thermally insulated.

6. Apparatus as claimed in claim 5, further including a thermostatically controlled heater for heating the interior of said chamber.

* * * * *